United States Patent [19]

Yoshida

[11] Patent Number: 4,903,014

[45] Date of Patent: Feb. 20, 1990

[54] CHARACTER FONT CONVERTING SYSTEM

[75] Inventor: Kunio Yoshida, Nara, Japan

[73] Assignee: Sharp Kabushiki Kaisha, Osaka, Japan

[21] Appl. No.: 118,027

[22] Filed: Nov. 6, 1987

[30] Foreign Application Priority Data

Nov. 6, 1986 [JP] Japan .................................. 61-265142

[51] Int. Cl.4 .............................................. G09G 1/16
[52] U.S. Cl. ..................... 340/727; 340/735; 340/750
[58] Field of Search ............... 340/727, 723, 724, 735, 340/748, 750, 790, 799, 798, 745, 749, 728; 382/46, 22; 400/121, 124

[56] References Cited

U.S. PATENT DOCUMENTS 3,921,135 11/1975 Komaru et al. ..................... 340/750
4,029,947 6/1977 Evans et al. ........................ 340/750
4,636,783 1/1987 Omachi ............................... 340/727

OTHER PUBLICATIONS

Bruce A. Artwick, "Microcomputer Displays, Graphics, and Animation", Prentice-Hall, N.J., 1985, pp. 42–43.

Primary Examiner—Alvin Oberley
Attorney, Agent, or Firm—Birch, Stewart, Kolasch and Birch

[57] ABSTRACT

A system for converting a character font dot pattern includes a peripheral dot detection circuit for detecting peripheral dots of a font pattern stored in a memory and subjects the detected peripheral dot pattern to a conversion operation for converting the dot pattern to a new orientation. The system further includes a paint over circuit which fills in the interior of the converted peripheral dot pattern to complete the conversion process.

3 Claims, 3 Drawing Sheets

FIG. 1(a)
Scanning
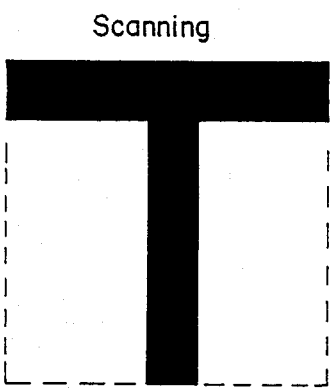
FIG. 1(b)
Judging
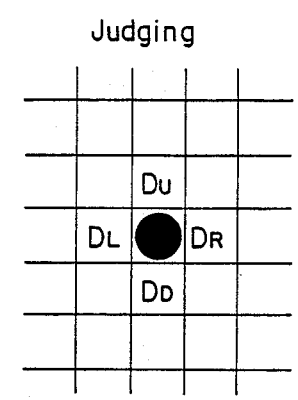
Converting
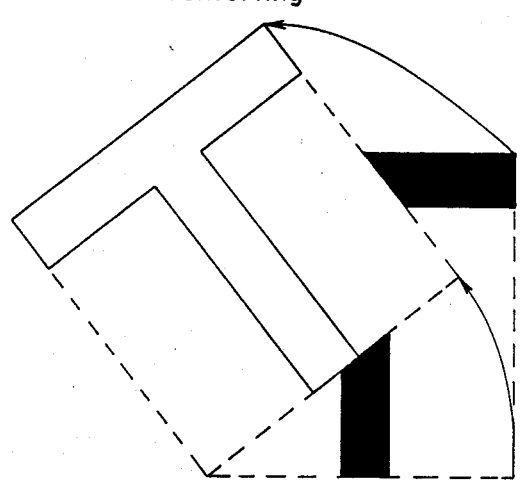
FIG. 1(c)
Painting-over
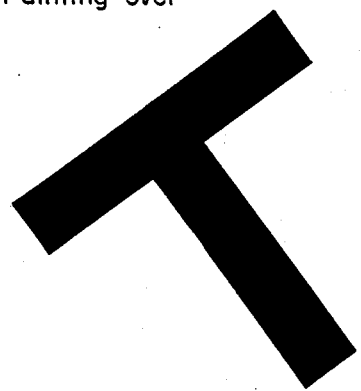
FIG. 1(d)

CHARACTER FONT CONVERTING SYSTEM

BACKGROUND OF THE INVENTION

The present invention relates to a printer, and more particularly, to a character converting system of a printer.

A printer with a font memory which stores a character font prints the font (dot pattern) corresponding to the character.

In printing it is sometimes necessary to enlarge characters or to change the configuration of the characters, for example, to invert the characters. In such a case, it is necessary to convert the original character font to another font. In converting, conventionally, the black dot patterns only are converted to obtain another font. However, even if the conversion is restricted only to the black dots, when the size of the specified font is large, or number of the dots in the font is large, it takes a long time to obtain the new font, because the conversion must be made over a plurality of times.

SUMMARY OF THE INVENTION

Accordingly, it is an object of the present invention to provide a character font converting system for converting a character font with a relatively high-speed.

Briefly described, in accordance with the present invention, a character font converting system comprises a periphery detection means which detects peripheral black dots of a character font stored in a font memory means, location calculation means which converts, according to a specified relational expression, the location of the black dots detected by the periphery detection means, converted pattern storage means which stores the above converted location as black dots, and the converted pattern storage means further comprises a paint-over means which regards the interior portion of the pattern made of the above black dots as black dots.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIGS. 1(a) (b) (c) (d) are views showing successively one example of a character font conversion according to the present invention;

DESCRIPTION OF THE PREFERRED EMBODIMENT

Figure 2:
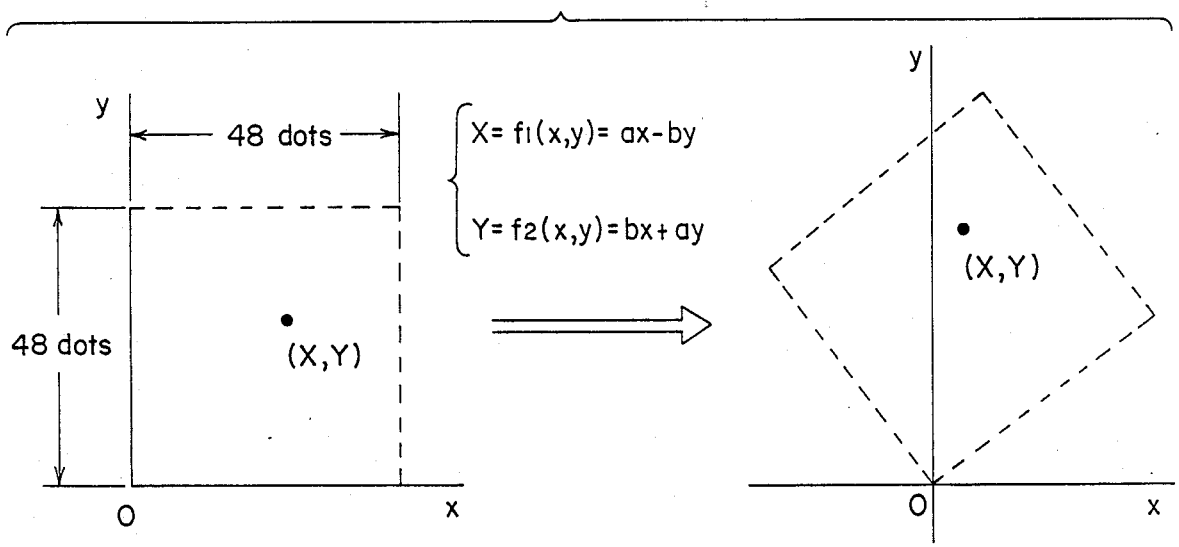
FIG. 2 is a view showing a coordinate conversion when a font is rotated.

Generally, when converting one font to another, a dot located at a point (x,y) on a given dot matrix is converted to a new font located at a point (X, Y) according to the following expressions (see FIG. 2):

$$X = f_1(x, y)$$
$$Y = f_2(x, y)$$
(1)

By making the point (X, Y) black if the point (x, y) is black, and making the point (X, Y) white if the point (x, y) is white, a new font is obtained according to the conversion parameters $f_1(x, y)$ and $f_2(x, y)$.

For the purpose of simplification, a conversion will be specifically described to rotate a character font in a 48×48 dot matrix.

When rotating, the point (X, Y) is obtained according to the following expressions:

$$X = f_1(x, y) = ax - by$$
$$Y = f_2(x, y) = bx + ay$$
(2)

In this case, a and b are constants related to the rotation angle which satisfies the following expression:

$$a^2 + b^2 = 1$$
(3)

Accordingly, by plotting the points (X, Y) from the conversion of points (x, y), a new rotated font is obtained.

Figure 3A:
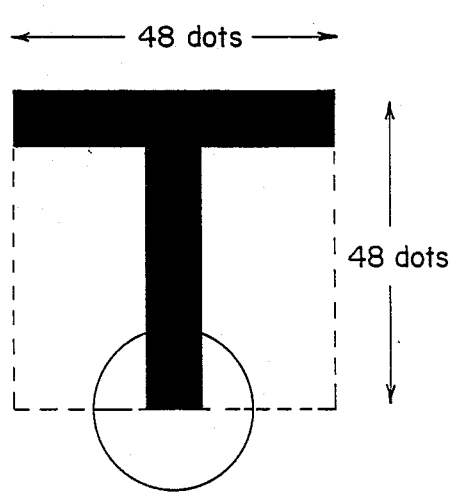
FIG. 3(a) is a view showing an example of a dot pattern of a character font.
Figure 3B:
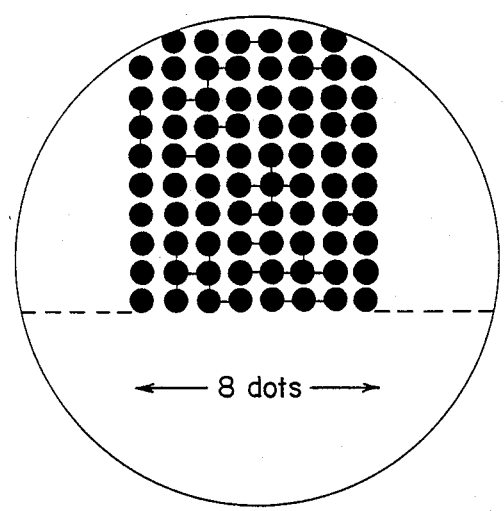
FIG. 3(b) is a partially enlarged view of FIG. (a)

In case a font is expressed in a dot matrix of 48 dots×48 dots, while the conversion (2) may be done for all dots contained in the matrix (48×48=2304 dots), conventionally, for the purpose of reducing the number of processes, conversion is made for only the case in which (x, y) is a black dot. For example, a character shown in FIG. 3 contains 704 black dots, so 704-time processings are done instead of 2304-time processings.

In this embodiment, conversion is made according to the following steps:

(1) The dot pattern of a character font (for example, "T" shown in FIG. 1(a)) is scanned and only the black dots adjacent to which is a white dot are detected and converted as shown in FIG. 1(b). Accordingly, the peripheral portion of the required font is formed as shown in FIG. 1(c).

(2) The inside of the above font is painted over as shown in FIG. 1(d).

In this embodiment shown in FIG. 1, only 186-time conversions are necessary while in a conventional method in which all the black dots are converted, as previously mentioned, 704-time conversions are necessary (186 is the number of peripheral black dots). Time for painting over the interior of the pattern is additionally required, but as a whole, a high-speed conversion is made because of the reduction of the conversion processing, which takes much calculation time.

Figure 4:
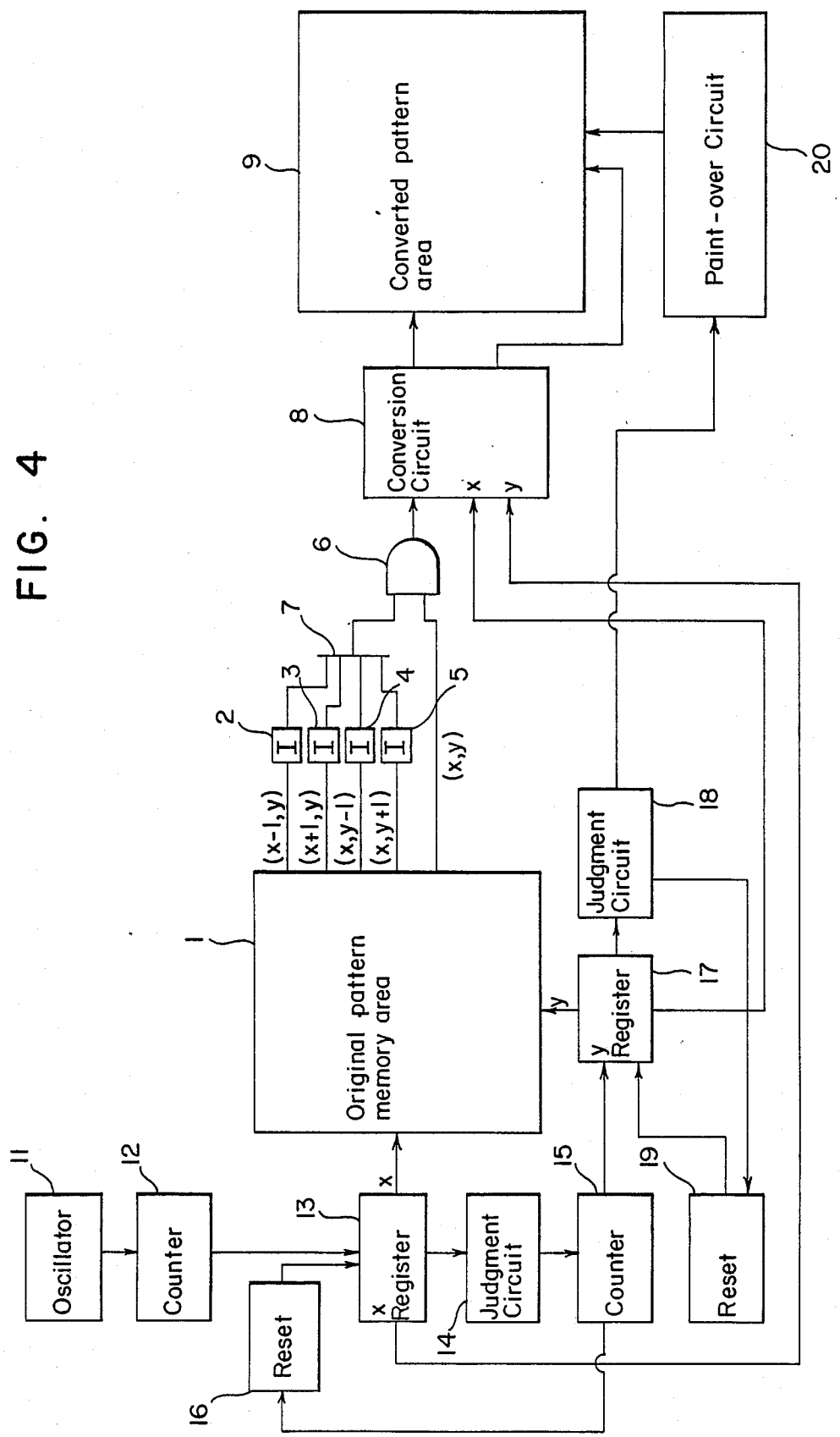
FIG. 4 is a block diagram of a character font conversion circuit.

FIG. 4 is a block diagram of a font conversion circuit. Original pattern memory area (Font memory) 1 is a memory which stores the original font. When a point (x, y) of the original pattern is given, whether the points (x−1, y), (x+1, y), (x, y−1), and (x, y+1) are black or white are outputted to inverters 2, 3, 4, and 5 respectively, while whether the point (x, y) is black or white is outputted to an AND gate 6 (In this embodiment, "1" is outputted when the dot is black and "0" is outputted when the dot is white). The output of the inverters 2 through 5 are outputted to an OR gate 7, and the output of the OR gate 7 is outputted to the AND gate 6. The output of a AND gate 6 is outputted to the conversion circuit 8. Thus, at the AND gate 6, it is judged whether the dot (x, y) is black and further, at least one dot above, below, left, or right of the dot is white. If so, the conversions $f_1(x, y)$ and $f_2(x, y)$ are made in the conversion circuit 8 and the result is plotted at the area 9 which stores the conversion pattern.

The point (x, y) is replaced successively as follows. In the present embodiment, a scan is made horizontally. A signal from oscillator 11 is counted at up counter 12 and stored at x register 13. The utput of the x register 13 is given as a coordinate x to the original pattern memory area 1. The output of the x register 13 is also inputted to the judgment circuit 14. When x>48 (when the scan ends as for one line), the judgment circuit 14 sends its output to up counter 15. The up counter 15 sends a signal to reset circuit 16 and the reset circuit 16 resets the x register 13.

The output of up counter 15 is also sent to the y register 17. The output of y register 17 is given as a coordinate y to the original pattern memory area 1. The output of the y register 17 is also inputted to judgment circuit 18. When y>48 (when the scan ends as for all the dots), the judgment circuit 18 sends its output to the reset circuit 19 and the reset circuit 19 resets the y register 17.

The outputs of x register 13 and y register 17 are also sent to the conversion circuit 8 respectively. When a black dot (x, y) is at the periphery of the original pattern, the conversion circuit 8 calculates the conversions $f_1(x, y)$ and $f_2(x, y)$ and the point (X, Y) stored in the converted pattern memory area 9 is made "1." When the scan ends for all the dots, the judgment circuit 18 sends its output to the paint-over circuit 20. The paint-over circuit 20 starts a painting over operation and makes the inside of the peripheral portion of the converted pattern "1." The conversion of the font ends with the end of the painting over operation.

In this circuit, the location of a white dot above, below, left or right of a black dot (x, y) is added as a condition of the conversion processing. Accordingly, the number of conversions reduces and the time for creating a new font is even shortened. This method is more effective when the number of black dots inside the peripheral portion of the font is very large, and when the character font has more dots, for example, 128×128 dots.

While only certain embodiments of the present invention have been described, it will be apparent to those skilled in the art that various changes and modifications may be made therein without departing from the spirit and scope of the present invention as claimed.

What is claimed is:

1. A system for converting a dot character font having a first orientation into a character font having a second orientation, comprising:
    font memory means for storing an original dot character font having said first orientation;
    peripheral dot detection means for detecting peripheral black dots of said dot character font stored in said font memory means including,
        address means for sequentially addressing locations in said font memory means,
        means for detecting whether an addressed location contains a black dot, and
        means for determining whether a black dot detected by said means for detecting is a peripheral black dot by detecting whether at least one location adjacent to said addressed location contains a white dot;
    font conversion means for converting the location of peripheral black dots detected by said peripheral dot detection means to said second orientation according to predetermined conversion parameters;
    converted font pattern memory means for storing the converted peripheral black dot pattern produced by said font conversion means; and
    paint-over means for converting white dots within said stored peripheral black dot pattern into black dots to complete the conversion of said original dot character font.

2. The system of claim 1, wherein said means for determining comprises logic gate means having inputs coupled to said addressed location and said adjacent locations and producing a signal at an output thereof coupled to said font conversion means when at least one adjacent location contains a white dot.

3. A method for converting a dot character font having a first orientation into a character font having a second orientation, comprising the steps of:
    storing an original dot character font having said first orientation in a font memory;
    detecting peripheral black dots of said dot character font stored in said font memory including the steps of,
        sequentially addressing locations in said font memory means,
        detecting whether an addressed location contains a black dot, and
        determining whether a black dot detected in said step of detecting whether an addressed location contains a black dot is a peripheral black dot by detecting whether at least one location adjacent to said addressed location contains a white dot;
    converting the location of detected peripheral black dots to said second orientation according to predetermined conversion parameters;
    storing the converted peripheral black dot pattern so produced in a converted font pattern memory; and
    converting white dots within said stored peripheral black dot pattern into black dots to complete the conversion of said original dot character font.

* * * * *